Sept. 20, 1966 H. MOCZALA 3,274,471
DIRECT CURRENT MOTOR WITH TRANSISTORIZED POWER SUPPLY
Filed Sept. 1, 1964 2 Sheets-Sheet 1

Inventor:
Helmut Moczala
By: Spencer & Kaye
ATTORNEYS

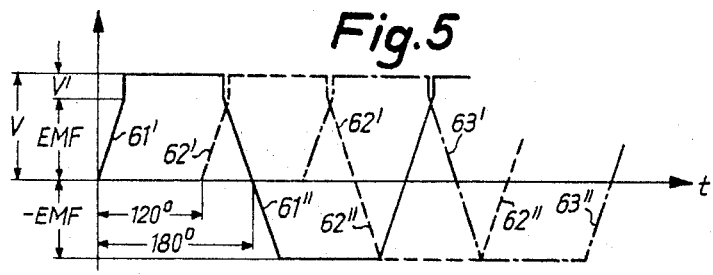
Fig. 5
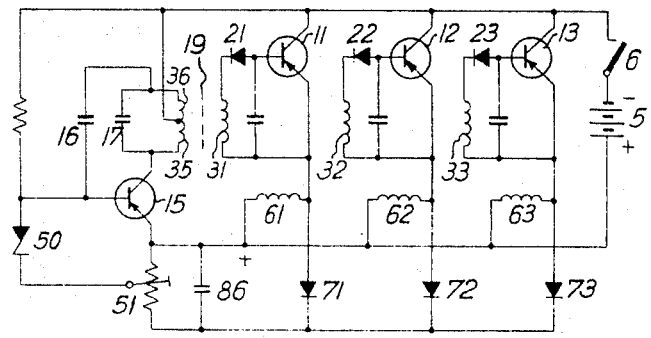
Fig. 4
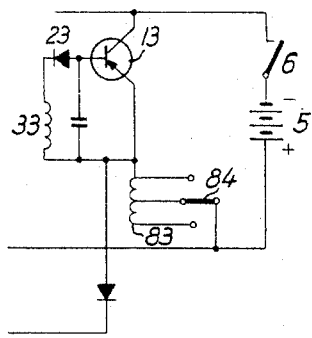
Fig. 6
Fig. 8
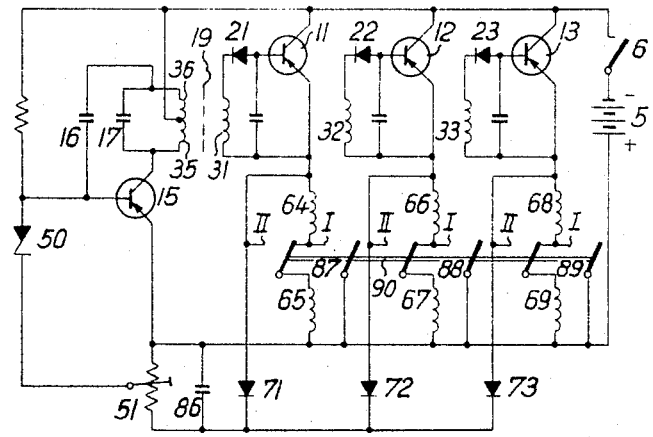
Fig. 7
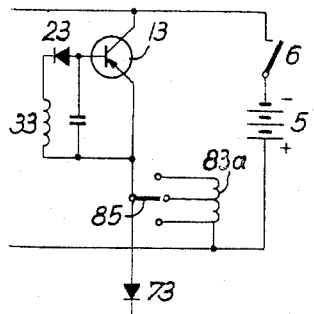

United States Patent Office 3,274,471
Patented Sept. 20, 1966

3,274,471
DIRECT CURRENT MOTOR WITH TRANSISTORIZED POWER SUPPLY
Helmut Moczala, Berlin-Grunewald, Germany, assignor to Licentia Patent-Verwaltungs-G.m.b.H., Frankfurt am Main, Germany
Filed Sept. 1, 1964, Ser. No. 393,572
Claims priority, application Germany, Sept. 6, 1963, L 45,797
8 Claims. (Cl. 318—138)

The present invention relates to a direct current (D.C.) motor whose armature windings are connected to a transistorized power supply.

A motor control arrangement of thies type is shown in copending application Serial No. 380,266, filed July 6, 1964, by Julian Hartmann and Helmut Moczala, for "Direct Current Motor with Transistorized Power Supply," wherein the rotational speed of a D.C. motor is regulated in that the transistors feeding the armature windings are controlled by a control circuit as a function of the instantaneous angular position of the rotor relative to the stator. The control circuit is constituted by a feedback circuit which consists of control windings and of a control transistor, this control circuit inducing the control windings which in turn control the armature transistors. According to the arrangement shown in the mentioned application, a so-called tachometer voltage, i.e., a voltage which is a function of the rotational speed of the motor, is generated, which tachometer voltage is applied to the control circuit of the motor. When a predetermined, so-called nominal speed is reached, the tachometer voltage renders the control circuit ineffective, thereby to interrupt the flow of current through the armature. The magnetic inductor for the tachometer voltage is constituted by the magnetic cylindrical rotor of the motor. The windings in which the tachometer voltage is induced lie in the same slots as the actual operating windings of the motor.

For a better understanding of the above-described arrangement disclosed, in the prior application, which is believed essential in order to obtain a fuller appreciation of the present invention, to be described in detail below, reference is made to FIGURES 1 to 3 of the accompanying drawings, in which FIGURE 1 is a perspective diagrammatic representation of a motor according to the prior application and shows certain ones of the electromechanical components, FIGURE 2 is a circuit diagram of one embodiment of the motor control arrangement according to the prior application, and FIGURE 3 is a graph of the timed relationship of a voltage effective in the motor control circuit of FIGURES 1 and 2.

FIGURES 1 and 2 show a rotor 17' mounted on a shaft 16', this rotor being, for the sake of simplicity, represented as a rotating, cylindrical magnet whose polarity is shown at N and S. The stationary armature windings, being the operating windings, are indicated at 1, 2, 3, 4. These windings are connected to transistors 11, 12, 13, 14 (FIGURE 2) which, in accordance with the particular angular position of the magnetic rotor, cause D.C. pulses to flow through the windings, in cyclical sequence, such that the magnet rotor is, as in a rotating field, continuously subjected to an electromagnetic pull or torque, thereby to start the motor and to maintain the rotor in rotation so long as a battery 5 is switched in by closing of a switch 6.

The cyclic sequence of the electronic control of the armature transistors, which function as controlled switching transistors, is brought about by the motor itself. Mounted on the shaft 16' for rotation therewith is a carrier 18 carrying a block 19, made of high-frequency iron or ferrite and having the shape of an arcuate segment. The purpose of this segment 19 is to conduct the magnetic flux of a high-frequency oscillator (this being the feedback), consisting of the windings 35 and 36 which are wound on a core 37, 38, the control transistor 15, and the capacitors 16 and 17, cyclically from core 38 to the cores of the control windings 31, 32, 33, 34. The high-frequency voltages induced in these control windings 31, 32, 33, 34, are rectified by means of respective diodes 21, 22, 23, 24, and are applied, as control voltages, to the bases of the armature transistors 11, 12, 13, 14. The emitter-collector path of each transistor thus remains conductive as long as a control voltage is applied to it, i.e., so long as there is a magnetic flux passing through the respective control coil. The oscillator itself, of course, remains excited so long as the battery 5 is connected to the circuit by means of the switch 6.

The transistor-fed D.C. motor could, theoretically, continuously increase its rotational speed until its counter electromotive force is induced in the armature windings, if no provision were made for maintaining a given predetermined rotational speed. According to the invention disclosed in the prior application, the rotational speed is limited by turning off the oscillator and hence the high-frequency control, this being done by applying to the base of the oscillator transistor the above-mentioned tachometer voltage which is proportional to the increasing rotational speed. Consequently, when there is no longer any regulation, the armature windings 1, 2, 3, 4, will no longer be fed with any current pulses, as a result of which the motor reduces its speed. But as the rotational speed drops, the tachometer voltage, i.e., the voltage which is proportional to the rotational speed of the motor, drops below the blocking voltage of the oscillator transistor, and this will, in a manner of speaking, again turn on the oscillator and the high-frequency control becomes effective once more. The motor therefore again has a driving pulse applied to it. This entire process is repeated, within narrow limits, of course, so that the motor will run at what is, for all practical purposes, a constant speed.

The basic components by means of which the rotational speed of the motor is regulated, together with their function, will be explained in conjunction with FIGURES 1 and 2. The cylindrical magnetic rotor 17' serves as the magnetic inductor of the tachometer generator which delivers the tachometer voltage, the same being induced in tachometer windings 26, 27, 28, 29, which lie in the same slots as do the working windings 1, 2, 3, 4. The tachometer windings are connected, via respective rectifier diodes 46, 47, 48, 49, and a control potentiometer 51 to the so-called tachometer circuit such that the rectified voltage taken off potentiometer 51 is applied via a Zener diode 50 to the emitter-base path of the oscillator transistor 15, whereat it acts as a blocking voltage. The Zener diode maintains this blocking voltage constant at a value which is precisely of such amplitude as to stop the oscillation.

The graph of FIGURE 3 shows the blocking voltage V which is limited by the Zener diode 50, this being a rectified sinusoidal voltage of a single exciter path of the tachometer generator. The rectified tachometer generator voltage can, for example, be so reduced by the potentiometer that the motor again has to increase its speed until the tachometer generator voltage increases and reaches the blocking voltage, whereupon the motor will be driven at the new, increased rotational speed. If this voltage is increased by the potentiometer, the rotational speed of the motor is reduced. In this way, the nominal r.p.m., i.e., the predetermined rotational speed at which the motor is to run, may be adjusted, within a wide range, by the potentiometer 51.

It is the primary object of the present invention to provide a control arrangement of the above type which is an improvement of the arrangement disclosed in the prior application, particularly to provide an arrangement in which the separate tachometer windings can be dispensed with.

Accordingly, the present invention resides in an arrangement of the same general type as described above, there being, however, no separate tachometer windings. Instead, the tachometer potential is derived from the armature windings themselves while the same are blocked from the power supply by the respective armature transistors.

Additional objects and advantages of the present invention will become apparent upon consideration of the following description when taken in conjunction with the accompanying drawings in which:

FIGURE 4 is a circuit diagram of one embodiment of a motor control arrangement according to the present invention.

FIGURE 5 is a graph showing the timed relationship of the voltage effective in the motor control circuit of FIGURE 4.

FIGURE 6 is a circuit diagram of part of another embodiment of a motor control arrangement according to the present invention.

FIGURE 7 is a circuit diagram of a part of yet another embodiment of a motor control arrangement according to the present invention.

FIGURE 8 is a circuit diagram of still a further embodiment of a motor control arrangement according to the present invention.

Figure 1:
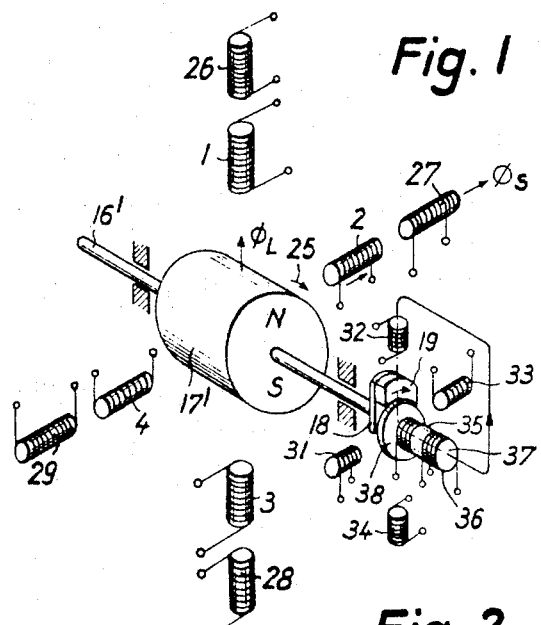
FIGURE 1 is a perspective diagrammatic view of a motor according to the invention disclosed in the above-mentioned application Serial No. 380,266.

Referring once again to the drawings and now to FIGURE 4 thereof, in which the same reference numerals are used to represent components analogous to those described above, the stationary armature windings, i.e., the actual working windings 61, 62, 63, are controlled by the respective switching transistors 11, 12, 13 such that, so long as the battery 5 is connected in circuit by closing of the switch 6, D.C. pulses will be made to flow cyclically through the windings, depending on the instantaneous angular position of the rotor with respect to the stator, so as to subject the rotor to an electromagnetic torque, in the manner of a rotating electric field. As before, the segment 19 acts to send the magnetic flux of the high-frequency oscillator cyclically through the control windings 31, 32, 33. The high-frequency voltages induced in the control windings are rectified by the diodes 21, 22, 23 and are applied, as control voltages, to the emitter-base paths of the armature transistors. Consequently, the emitter-collector path of each armature transistor remains conductive so long as a control voltage is applied, i.e., so long as there is a magnetic flux through the corresponding control winding, the oscillator remaining excited as long as the battery 5 is switched in.

Figure 2:
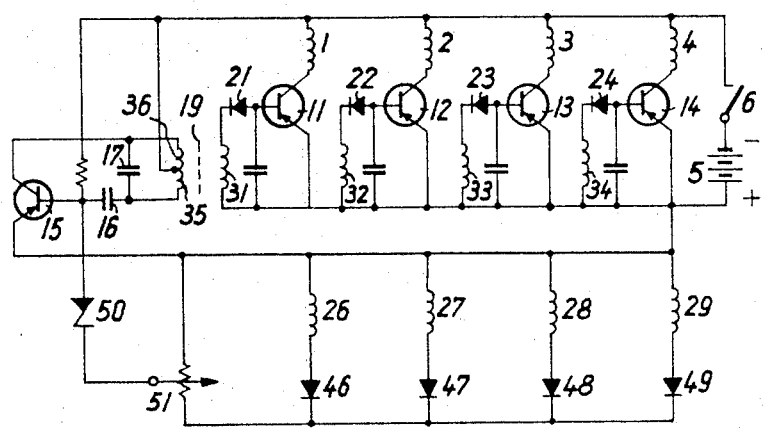
FIGURE 2 is a circuit diagram of the motor control arrangement according to the invention of application Serial No. 380,266.
Figure 3:
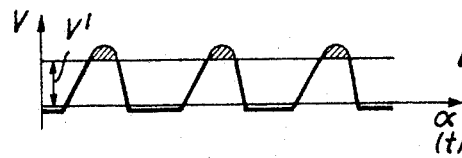
FIGURE 3 is a graph showing the time relationship of a voltage appearing in the circuit of FIGURE 2.

As before, the motor, which would increase its rotational speed until its counter electromotive force is induced in the armature windings, is regulated to a predetermined speed by the application of a tachometer voltage. The same is, in the arrangement shown in FIGURES 1 and 2, representing the invention disclosed in the prior application, derived from the separate windings 26, 27, 28, 29. According to the present invention, however, the tachometer voltage for speed-regulating the motor is derived from the very same armature windings which produce the rotary field that drives the motor. To this end, one terminal of each of the armature windings 61, 62, 63, is connected to the positive terminal of the battery 5, while the other terminal of each armature winding is connected to the negative terminal of the battery via the emitter-collector path of the corresponding switching transistor 11, 12, 13. Furthermore, the armature windings 61, 62, 63, are connected, via respective rectifier diodes 71, 72, 73, a capacitor 86 and the regulating potentiometer 51 to the so-called tachometer circuit. The potential taken off the tap of the potentiometer 51 is applied via the Zener diode 50 to the emitter-base path of the control transistor 15, there to act as a blocking voltage. The Zener diode holds the blocking voltages constant and interrupts the oscillator voltage.

In this way, the armature windings 61, 62, 63, serve a double purpose, namely, to produce the rotary field which drives the rotor and to yield the tachometer voltage. This is made possible by the fact that the armature windings, in contradistinction to armature windings of conventional D.C. motors provided with brushes, have a voltage connected across them by the respective switching transistors only throughout the working half-wave of the operating cycle, as shown in FIGURE 5 at 61′, 62′, 63′, the amplitude of the working half-wave being derived from the electromotive force (E.M.F.) which is enlarged by V′ and, in accordance with this amount, is equal to the voltage V of the battery 5. As a result, the armature windings are available during the other half of the operating cycle, which may be called the measuring half-wave as opposed to the above-mentioned working half-wave; this is shown at 61″, 62″, 63″, during which measuring half-wave the E.M.F. may be measured, as depicted in FIGURE 5.

The three armature windings 61, 62, 63, forming part of the arrangement described above are, in practice, oriented radially with respect to the center of the rotor and are angularly displaced 120° from each other. The windings are so designed that the measuring half-wave 61″, 62″, 63″, are trapezoidal and provide a constant measuring voltage which is used, in the manner described above, as the tachometer voltage for the purpose of regulating the speed of the motor.

It will be seen from the above that the present invention resides in a direct current motor having a stator and a rotor, a plurality of armature windings, a power supply, a plurality of armature transistors connecting the power supply to the respective armature windings, control circuit means connected to the armature transistors for controlling the same in dependence upon the relative angular position between the stator and rotor, which control circuit means include an oscillatory circuit incorporating a control transistor, and speed regulating means connected to the control transistor for applying thereto a potentiometer potential, dependent on the rotational speed of the motor, which renders the control circuit means ineffective at a given predetermined rotational speed. The speed regulating means themselves incorporate means connected to the armature windings for deriving the tachometer voltage from the armature windings throughout respective parts of each revolution of the motor, and means for rendering the armature transistors non-conductive during the respective parts of each revolution, thereby blocking the respective armature windings from the power supply during the respective parts of each revolution.

FIGURE 6 shows an arrangement by means of which the motor may be regulated to run at more than one predetermined speed. To this end, each armature winding—for purposes of simplicity, only one armature winding 83 is illustrated in FIGURE 6—is subdivided into a plurality of parts, corresponding in number to the number of speeds to which the motor is to be regulated. Thus, the circuit of FIGURE 6 shows the winding 83 as having a plurality of taps each of which may be connected, by means of a selector switch 84, to the positive terminal of the battery 5.

The circuit of FIGURE 7 is basically similar to that of FIGURE 6, and differs therefrom only in that each of the several armature windings—of which only winding 83a is illustrated in FIGURE 7—is permanently connected to the positive terminal of the battery 5 but has a plurality of taps each of which is connectible, by means of a switch 85, to the emitter-collector circuit of the armature transistor 13.

FIGURE 8 shows a circuit in accordance with the present invention wherein the motor may be regulated to run at either of two speeds which are in the ratio of 1:2 to each other. To this end, each of the armature windings is subdivided into two equal parts 64, 65; 66, 67; 68, 69. Each two-part winding has associated with it a double-pole switch, 87, 88, 89, so that the two parts of each winding can be connected into the circuit either serially (position I) or parallelly (position II). The three switches 87, 88, 89 are ganged by means of a linkage 90. In this way, the motor may be made to run at either of its two speeds while maintaining the same efficiency, this being due to the fact that in each of its running positions the motor makes use of the whole of each of its windings.

It will be appreciated that the present invention constitutes an improvement over the arrangement shown in the mentioned prior application in that, the separate tachometer windings being dispensed with, only the operating windings need to be accommodated within the stator slots, as a result of which these armature windings can be made of heavier wire than if space had to be provided for separate tachometer windings. This, in turn, makes it possible to provide a motor having a higher efficiency. Furthermore, a conventional D.C. motor whose armature windings are fed by a transistorized circuit but not equipped with any speed regulating means can, by following the present invention, be converted for use as a speed-controlled motor.

It will be understood that the above description of the present invention is susceptible to various modifications, changes and adaptations, and the same are intended to be comprehended within the meaning and range of equivalents of the appended claims.

What is claimed is:

1. In a D.C. motor having a stator and a rotor, the combination which comprises: three armature windings displaced 120° relative to each other; a power supply; a plurality of armature transistors connecting said power supply to respective ones of said windings; control circuit means connected to said armature transistors for controlling the same in dependence on the relative angular position between the stator and rotor, said control circuit means including an oscillatory circuit incorporating a control transistor; and speed regulating means connected to said control transistor for applying thereto a tachometer potential, dependent on the rotational speed of the motor, which renders said control circuit means ineffective at a given predetermined rotational speed, said speed regulating means incorparating means connected to said armature windings for deriving said tachometer voltage from said armature windings throughout respective parts of each revolution of the motor, and means connected to said armature transistors for rendering the same non-conductive during said respective parts of each revolution, thereby blocking the respective armature windings from said power supply during said respective parts of each revolution.

2. The combination defined in claim 5 wherein said power supply has positive and negative terminals, and wherein each of said armature windings is connected directly to said positive terminal of said power supply and is connected to said negative terminal of said power supply via the emitter-collector path of the respective armature transistor.

3. The combination defined in claim 2 further comprising means for rendering each of said armature transistors non-conductive during a respective part of each revolution of the motor and including a plurality of control windings each connected between the emitter and base of a respective armature transistor.

4. The combination defined in claim 2 further comprising a plurality of rectifiers each connected between a respective one of said armature windings and said control transistor, and a capacitor connected in parallel with all of the paths defined by said rectifiers and said armature windings.

5. In a D.C. motor having a stator and a rotor, armature windings, a power supply, armature transistors connecting the power supply to the armature windings, a control circuit connected to the armature transistors for controlling the same in dependence upon the relative angular position between the stator and rotor, the control circuit including an oscillatory circuit incorporating a control transistor, and speed regulating means connected to the control circuit for applying thereto a tachometer potential, dependent on the rotational speed of the motor, which renders the control circuit ineffective at a given predetermined rotational speed, the improvement that said tachometer potential is derived from said armature windings while the same are blocked from said power supply by said armature transistors.

6. In a D.C. motor having a stator and a rotor, the combination which comprises: a plurality of armature windings each subdivided into a plurality of parts; a power supply having positive and negative terminals, with each of said armature windings being connected directly to said positive terminal; a plurality of armature transistors each having an emitter-collector path via which a respective one of said armature windings is connected to said negative terminal; control circuit means connected to said armature transistors for controlling the same in dependence on the relative angular position between the stator and rotor, said control circuit means including an oscillatory circuit incorporating a control transistor; speed regulating means connected to said control transistor for applying thereto a tachometer potential, dependent on the rotational speed of the motor, which renders said control circuit means ineffective at a given predetermined rotational speed, said speed regulating means incorporating means connected to said armature windings for deriving said tachometer voltage from said armature windings throughout respective parts of each revolution of motor, and means connected to said armature transistors for rendering the same nonconductive during said respective parts of each revolution, thereby blocking the respective armature windings from each said power supply during said respective parts of said revolution; and switch means provided for connecting any given part of each armature winding to said positive terminal of said power supply, thereby to enable the speed of the motor to be regulated to any one of a plurality of speeds.

7. In a D.C. motor having a stator and a rotor, the combination which comprises: a plurality of armature windings each subdivided into a plurality of parts; a power supply having positive and negative terminals, with each of said armature windings being connected directly to said positive terminal; a plurality of armature transistors each having an emitter-collector path via which a respective one of said armature windings is connected to said negative terminals; control circuit means connected to said armature transistors for controlling the same in dependence on the relative angular position between the stator and rotor, said control circuit means including an oscillatory circuit incorporating a control transistor; speed regulating means connected to said control transistor for applying thereto a tachometer potential, dependent on the rotational speed of the motor, which renders said control circuit means ineffective at a given predetermined rotational speed, said speed regulating means incorporating means connected to said armature windings for deriving said tachometer voltage from said armature windings throughout respective parts of each revolution of the motor, and means connected to said armature transistors for rendering the same nonconductive during said respective parts of each revolution, thereby blocking the respective armature windings from said power supply during said respective parts of said revolution; and switch means for connecting any given part of each said armature winding to the emitter-collector path of the respective armature transistor and hence to said negative terminal of said power supply, thereby to enable the speed of the motor to be regulated to any one of a plurality of different speeds.

8. In a D.C. motor having a stator and a rotor, the combination which comprises: a plurality of armature windings each subdivided into two equal parts; a power supply having positive and negative terminals, with each of said armature windings being connected directly to said positive terminal; a plurality of armature transistors each having an emitter-collector path via which a respective one of said armature windings is connected to said negative terminal; control circuit means connected to said armature transistors for controlling the same in dependence on the relative angular position between the stator and rotor, said control circuit means including an oscillatory circuit incorporating a control transistor; speed regulating means connected to said control transistor for applying thereto a tachometer potential, dependent on the rotational speed of the motor, which renders said control circuit means ineffective at a given predetermined rotational speed, said speed regulating means incorporating means connected to said armature windings for deriving said tachometer voltage from said armature windings throughout respective parts of each revolution of motor, and means connected to said armature transistors for rendering the same nonconductive during said respective parts of each revolution, thereby blocking the respective armature windings from each said power supply during said respective parts of said revolution; and switch means for selectively connecting the two parts of each winding in series or in parallel, thereby to enable the speed of the motor to be regulated to either of two speeds which bear a 1:2 relationship to each other.

References Cited by the Examiner

UNITED STATES PATENTS

| | | | |
|---|---|---|---|
| 2,814,769 | 11/1957 | Williams | 318—138 X |
| 3,124,733 | 3/1964 | Andrews | 318—254 X |

ORIS L. RADER, *Primary Examiner.*

S. GORDON, G. SIMMONS, *Assistant Examiners.*